(12) United States Patent
Pillai et al.

(10) Patent No.: US 11,822,871 B2
(45) Date of Patent: Nov. 21, 2023

(54) CSS CUSTOMIZATION OF USER INTERFACE COMPONENTS

(71) Applicant: MORGAN STANLEY SERVICES GROUP INC., New York, NY (US)

(72) Inventors: Harikumar Pillai, Mumbai (IN); Jigar Gala, Mumbai (IN); Abhishek Jain, Jersey City, NJ (US); Afshir Irani, Bronx, NY (US); Charles W. Mayle, Atlanta, GA (US); Jeffrey M. Kaufman, Port Washington, NY (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 19 days.

(21) Appl. No.: 17/590,904

(22) Filed: Feb. 2, 2022

(65) Prior Publication Data
US 2023/0244852 A1 Aug. 3, 2023

(51) Int. Cl.
*G06F 40/143* (2020.01)
*G06F 9/451* (2018.01)
(Continued)

(52) U.S. Cl.
CPC .......... *G06F 40/143* (2020.01); *G06F 3/0484* (2013.01); *G06F 9/451* (2018.02);
(Continued)

(58) Field of Classification Search
CPC ...... G06F 40/143; G06F 3/0484; G06F 9/451; G06F 40/134; G06F 40/18
See application file for complete search history.

(56) References Cited

U.S. PATENT DOCUMENTS 6,188,403 B1  2/2001 Sacerdoti et al.
6,981,212 B1 * 12/2005 Claussen ............... G06F 16/986
                                                              717/148

(Continued)

FOREIGN PATENT DOCUMENTS

CA        2506064 A1 * 10/2006 ....... G06F 17/30905

OTHER PUBLICATIONS

Eric Bidelman, Custom Elements v1—Reusable WebComponents, web.dev (Sep. 5, 2019), https://web.dev/custom-elements-v1/#upgrades.*

(Continued)

*Primary Examiner* — Asher D Kells
(74) *Attorney, Agent, or Firm* — WEITZMAN LAW OFFICES LLC

(57) ABSTRACT

A system for generating user interface (UI) components in a web-based interactive UI is disclosed. Instructions, when executed by processors, cause the processors to receive CSS files specifying a desired standardized appearance for UI components, receive an HTML file specifying the interactive UI and including tags not specified by any HTML standard, corresponding to one or more UI components; and provide a webpage comprising the UI components to a human user. When rendered and executed by a web browser of the human user, the web browser will render the UI components indicated by the tags, load data into the UI components and style the UI components in accordance with the CSS file. The browser will also receive input requesting a change to presentation of data in the UI components and update UI components in accordance with the requested change. Additional features improving datagrid, chart, and filter functionality are provided.

16 Claims, 10 Drawing Sheets

(51) Int. Cl.
*G06F 40/18* (2020.01)
*G06F 40/134* (2020.01)
*G06F 3/0484* (2022.01)
*G06T 11/20* (2006.01)

(52) U.S. Cl.
CPC ............ *G06F 40/134* (2020.01); *G06F 40/18* (2020.01); *G06T 11/206* (2013.01)

(56) References Cited

U.S. PATENT DOCUMENTS

| | | | |
|---|---|---|---|
| 7,089,330 B1* | 8/2006 | Mason | G06F 16/972 707/999.005 |
| 7,176,923 B2 | 2/2007 | Vignet | |
| 9,467,745 B1* | 10/2016 | Hotchkiss | H04N 21/25 |
| 10,627,998 B2 | 4/2020 | Tompkins | |
| 2004/0119713 A1* | 6/2004 | Meyringer | G06Q 10/06 345/440 |
| 2004/0210822 A1* | 10/2004 | Kotler | G06F 40/103 715/227 |
| 2004/0216042 A1* | 10/2004 | Consolatti | G06F 8/30 715/234 |
| 2004/0252136 A1 | 12/2004 | Bhatt et al. | |
| 2005/0044497 A1* | 2/2005 | Kotler | G06F 40/103 715/267 |
| 2005/0050088 A1* | 3/2005 | Kotler | G06F 40/177 707/999.102 |
| 2017/0004638 A1* | 1/2017 | Csenteri | G06T 11/206 |
| 2018/0004851 A1 | 1/2018 | Zarins et al. | |
| 2019/0042581 A1 | 2/2019 | Aylett et al. | |
| 2019/0196684 A1 | 6/2019 | Kim et al. | |
| 2019/0278743 A1* | 9/2019 | Hayasaka | G06F 40/154 |
| 2020/0273226 A1 | 8/2020 | Lee et al. | |

OTHER PUBLICATIONS

WHATWG, HTML Living Standard (Apr. 6, 2023).*

* cited by examiner

400

| | Office | Sales - June | Sales - May | Sales - YTD | 425 |
|---|---|---|---|---|---|
| 405 | NYC | $10.1M | $9.2M | $75.3M | |
| 405 | Chicago | $8.6M | $9.0M | $50.4M | |
| 405 | Seattle | $3.3M | $2.9M | $19.0M | |
| 410 | PCs | $2.3M | $1.8M | $10.0M | |
| | | Units sold - June | Units sold - May | Units Sold - YTD | 420 |
| 415 | Windows | 400 | 375 | 2.3K | |
| 415 | Mac | 420 | 350 | 3.1K | |
| 410 | Phones | $1.0M | $1.1M | $9.0M | |
| 405 | Houston | $1.1M | $1.0M | $7.2M | |
| 410 | PCs | $620K | $550K | $4.3M | |
| 410 | Phones | $490K | $450K | $2.9M | |

*Fig. 4*

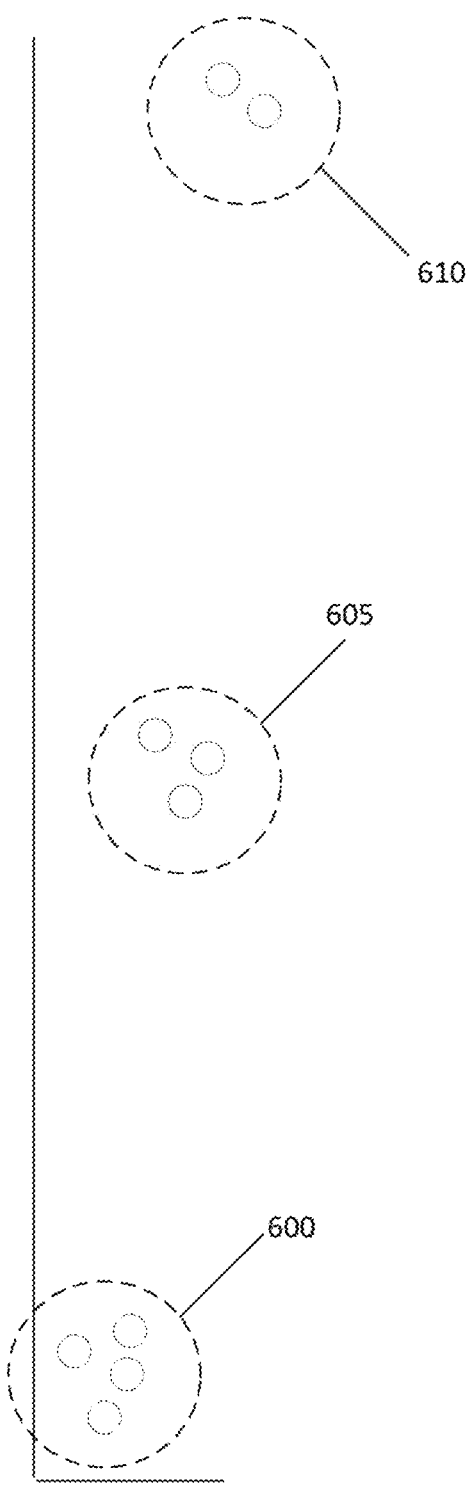
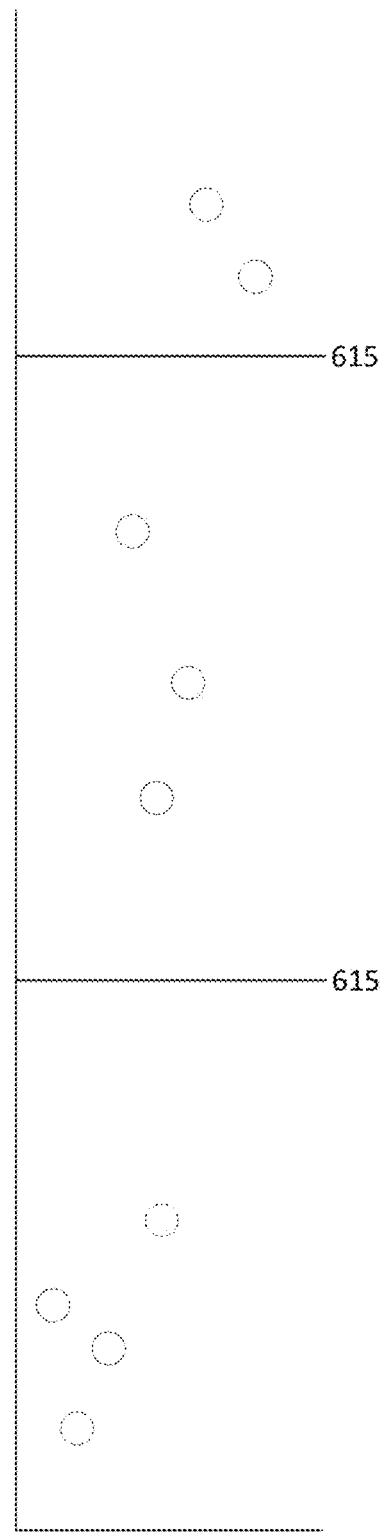
*Fig. 6A*  *Fig. 6B*

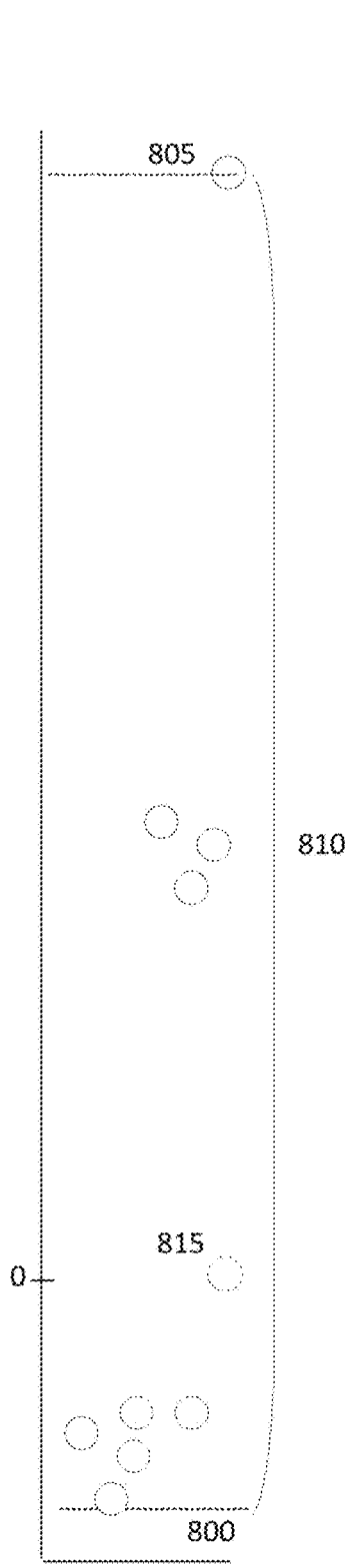 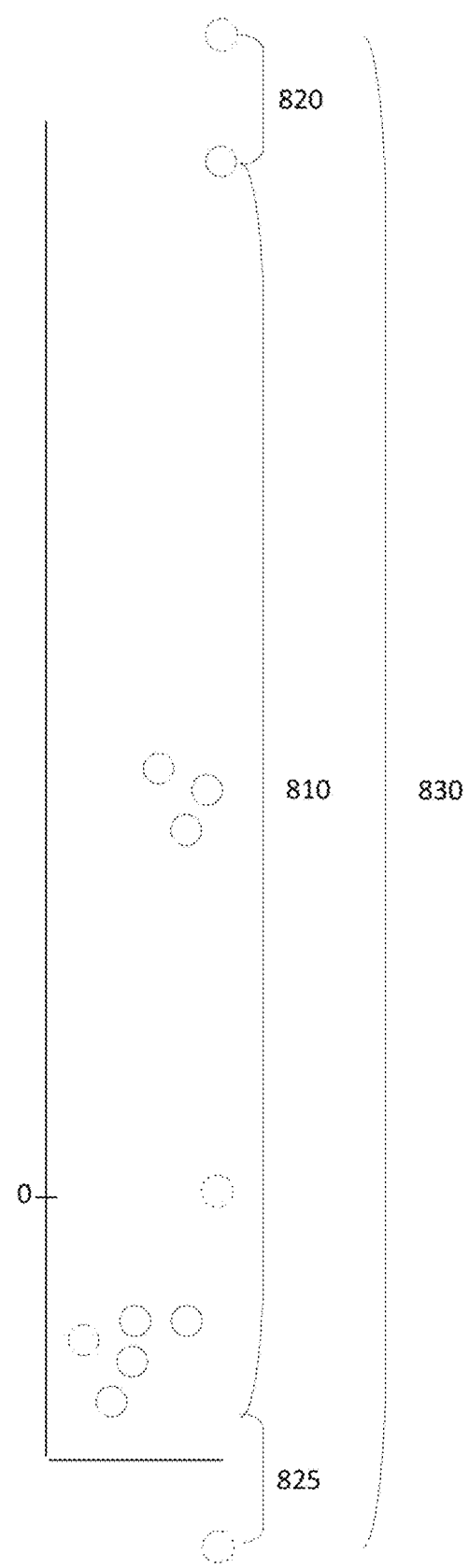
*Fig. 8A*  *Fig. 8B*

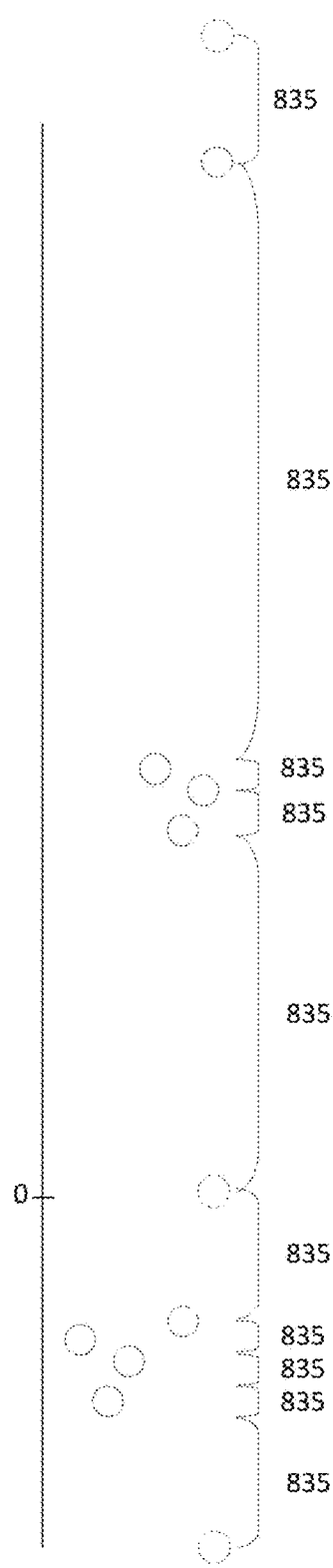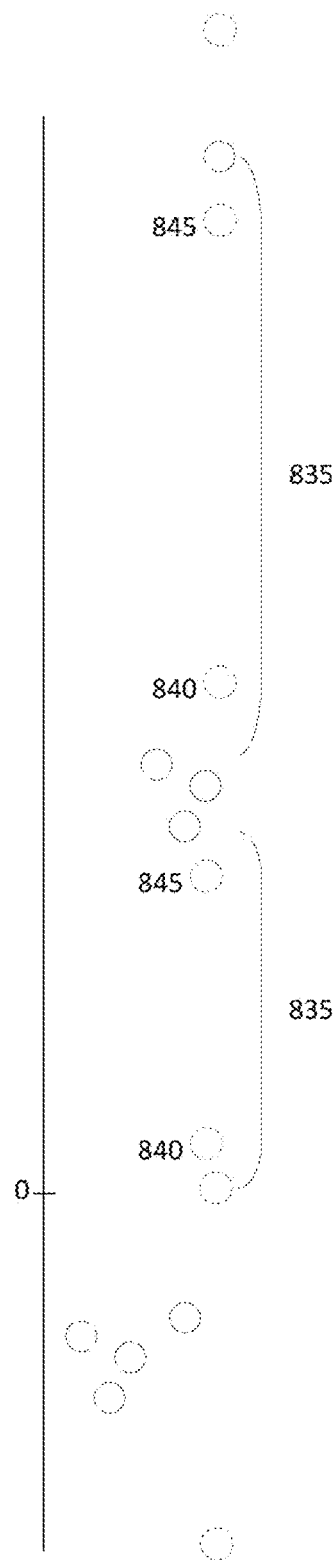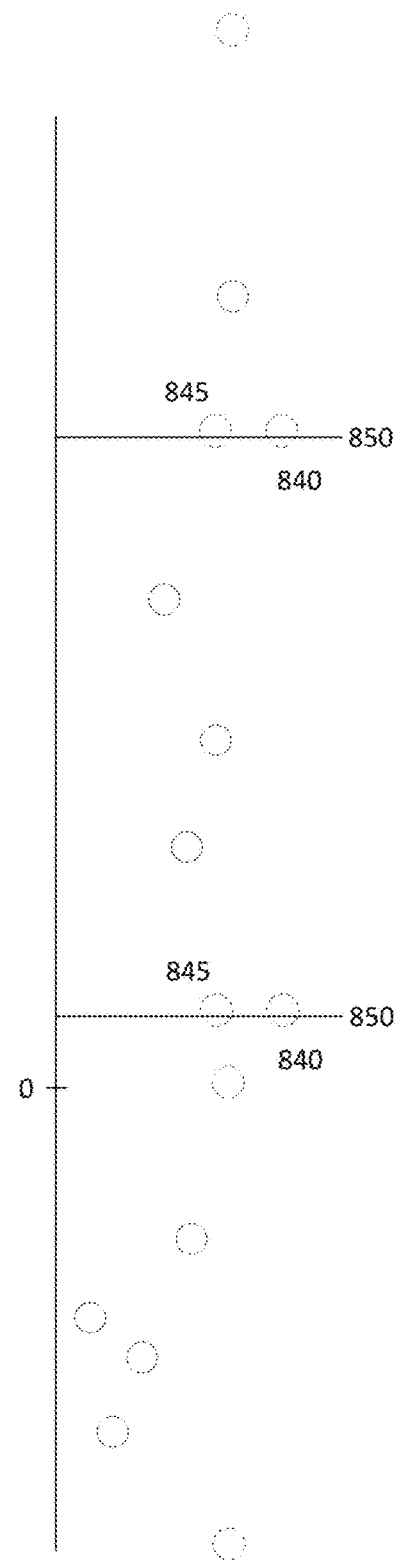
*Fig. 8C*    *Fig. 8D*    *Fig. 8E*

CSS CUSTOMIZATION OF USER INTERFACE COMPONENTS

FIELD OF INVENTION

This application relates to systems for and methods of automated generation of web-based user interfaces, and more specifically, to systems that provide designers the ability to control presentation of data sets in a web-based application.

BACKGROUND

Web pages have become an extremely common medium for displaying data and user interfaces, since a web page can be designed once and then displayed on a variety of computing devices, operating systems, and browsers while maintaining a same visual design. However, Hypertext markup Language (HTML), the backbone language of web design, is not designed with interactivity or fine control over presentation in mind. Instead, HTML is typically supplemented with JavaScript and Cascading Style Sheets (CSS) to provide interactivity and the fine control, respectively.

Even with the features provided by JavaScript and CSS, programming knowledge is required to create a graphical data structure that presents data in a useful format and allows interactive features such as sorting, filtering, and drill-down menus. For example, even simple behavior such as sorting a table with rows of data by their values in a particular column can require dozens of lines of code if implemented from scratch. Even if a webpage designer does have the programming knowledge necessary to implement all desired behaviors and features, the implementation process may require hours of writing code and testing the code on possible inputs. These barriers to effective development are partially overcome by existing software libraries such as D3.js, but configuration options may be limited, consistent presentation is not guaranteed, and more programming knowledge may be required to be effective than is desired for a product that intends to make web application development smoother and simpler.

Thus, there are advantages to a system that allows even non-programmers to specify configurations for the presentation of data components and to automatically present data in a more elegant fashion than is possible with existing software solutions. There are also advantages to systems that allow programmers to add functionality to existing data components and to develop new code only if existing configuration options are insufficient.

SUMMARY OF THE INVENTION

A system for generating user interface components in a web-based interactive user interface is disclosed. The system comprises one or more processors and non-transitory memory storing instructions. When the instructions are executed by the one or more processors, the one or more processors receive one or more CSS files specifying a desired standardized appearance for user interface components; receive an HTML file specifying the interactive user interface and including tags not specified by any HTML standard, corresponding to one or more user interface components; and provide a webpage comprising the one or more user interface components to a human user. The webpage, when rendered and executed by a web browser of the human user, will cause the web browser to, via a script executed by a web browser displaying the user interface, render the one or more user interface components indicated by the tags, load data into the one or more user interface components and style the one or more user interface components in accordance with the CSS file. The web browser will also receive, from a human user of the user interface, input requesting a change to presentation of data in the one or more user interface components; and via either the script or a second script, update the one or more user interface components to update presentation of the data in accordance with the requested change.

Similarly, a computer-implemented method for generating user interface components in a web-based interactive user interface is disclosed. The method comprises, among other features, receiving one or more CSS files specifying a desired standardized appearance for user interface components, receiving an HTML file specifying the interactive user interface and including tags not specified by any HTML standard, corresponding to one or more user interface components; and providing a webpage comprising the one or more user interface components to a human user. The webpage, when rendered and executed by a web browser of the human user, will cause the web browser to, via a script executed by a web browser displaying the user interface, render the one or more user interface components indicated by the tags, load data into the one or more user interface components and style the one or more user interface components in accordance with the CSS file. The web browser will also receive, from a human user of the user interface, input requesting a change to presentation of data in the one or more user interface components; and via either the script or a second script, update the one or more user interface components to update presentation of the data in accordance with the requested change.

Additional features include variations of the above system and method wherein one or more user interface components is a nested datagrid; wherein the one or more filtering options are provided based on a filter plugin; wherein charts are automatically modified to include axis breaks for clearer data presentation; wherein datagrids are exported into an Open Office XML (OOXML) formatted spreadsheet; wherein user column preferences are stored for future viewing of a datagrid, and wherein other functionality is added to datagrids.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

FIG. 4 depicts a multi-dimensional nested datagrid that can be generated according to the system and methods described herein;

FIG. 6A and FIG. 6B depict two versions of a chart with identical data; one with a uniform axis, and one where multiple axis breaks are introduced to allow widely variant values to be plotted without shifting to a non-uniform axis that doesn't preserve absolute differences in data values;

FIGS. 8A through 8E depict graphically the determinations being made at various steps of the method depicted in FIG. 7.

DETAILED DESCRIPTION

Figure 1:
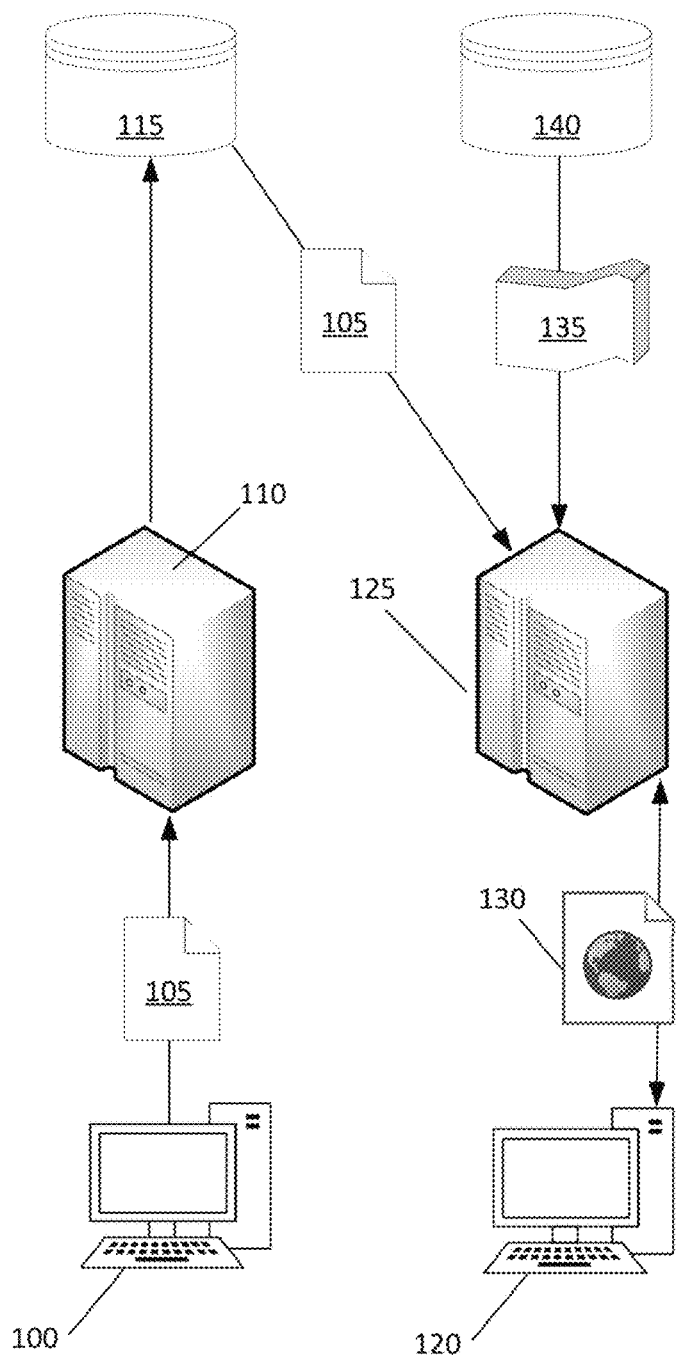
FIG. 1 depicts a network of computing devices to be used in a system for generating web-based user interfaces that include interactive presentations of data to a viewer.

In order to address the issues described above, a system is provided to allow front end developers to create web-based user interfaces that include interactive presentations of data to a viewer with various enhanced functionalities. In one embodiment, known as Starburst, a library of reusable components and services are provided, built using Angular and the .NET framework. Starburst provides a configuration-driven approach to building various user interface controls, including datagrids, charts, and filters. By focusing on configurations instead of writing code, existing code can be reused, new bugs introduced by development avoided, and development time drastically decreased, all while standardizing appearance by relying on provision of CSS files to give a consistent user experience. When development is required to supplement configuration-based data component behavior, a plugin model is used for developers to write functions, typically in Angular or TypeScript, governing the additional behavior or functionality.

For example, in order to add a datagrid, chart, or filter to a web application, the following tags may be added to the source code, respectively;

```
<sb-datagrid [gridId]="'grid-id'" [data]="gridData"
[renderer]="gridRenderer" [gridOptions]="gridConfig.settings"
(onLinkClicked)="launchPopup($event)"
(onRequestData)="getData($event)"
(onExportExcel)="exportExcel($event)"></sb-datagrid>
    <sb-chart [renderer]="chartRenderer" [data]="chartData"
[width]="width" [height]="height" [expandable]="expandable"
[stretch]="stretch" [id]="'sample'"></sb-chart>
    <sb-tab-filter [meta]="filterConfig" [data]="filterData"
(onValueSelected)="filterChanged($event)"></sb-tab-filter>
```

The custom tags "<sb-datagrid>," "<sb-chart>," and "<sb-tab-filter>" are identified within the web page by the Angular library, and the tags are replaced/expanded into complex HTML data structures in a format expected by additional scripts within the Angular library that will load data from an external source, populate the data structure, control presentation, and provide interactivity, such as sorting and filtering the data presented.

Attributes of the tags above, such as "[renderer]," "[data]," and "[gridoptions]," specify configuration files to be accessed and used to further refine presentation and behavior. In a preferred embodiment, these configuration files are provided in the JavaScript Object Notation (JSON) format, for example:

```
{
  "graph": [
    {
      "style": "columns",
```

-continued

```
      "axis": {
        "y": {
          "format": "$0,0.[00]",
          "align": "right",
          "min": 0,
          "maxAxisBreaks": 1,
          "angle": 0
        },
        "x": { }
      },
      "series": [
        {
          "keyExpression": "",
          "labelExpression": "",
          "expression": ""
        },
        { }
      ]
    }
  ]
};
```

The above example would specify that a chart should be shown as a series of columns aligned with the y-axis, showing zero as the minimum point, formatting the labels of values as currency. An axis break, as discussed further below, may be incorporated if there are outlying data not easily displayed on the same scale of axis as the rest of the data.

Although a preferred embodiment of the presently described methods is accomplished using Angular and TypeScript, the embodiment might be adapted to use any other framework or scripting language instead, such as JavaScript, ECMAScript, Dart, CoffeeScript, etc. Likewise, although HTML and CSS are backbone technologies that are unlikely to be replaced in the near future, the functionality described may be implemented using different future specifications for document structure (including other varieties of XML) or presentation.

FIG. 1 depicts a network of computing devices to be used in a system for generating web-based user interfaces that include interactive presentations of data to a viewer.

A developer's computing device 100 is initially used to write HTML, JSON, TypeScript, Angular, or other code 105 for controlling the appearance or behavior of a data presentation user interface component. In order to publish the code for use in front end applications, the code 105 is transmitted to a server or repository 110 that handles code version management. The server or repository 110 also serves as an interface for other developers to download the code 105 for re-use in their own web applications, or for modification to add new features to or remove bugs from the master copy of the code 105. Ultimately, the code 105 is stored in a server, database, or other long-term storage system 115 that stores various web assets to be included in web applications, such as scripts, CSS files, images, or anything else that is loaded in conjunction with an HTML file to enhance its functionality in the web browser.

When an end user uses their computing device 120 to request access to the web application including the user interface components governed by the code 105, a web server 125 will provide the webpage 130 to the user computing device 120 for display by a web browser on the computing device. In doing so, the web server 125 is used as an interface to load various assets, including the code 105 (or compiled code derived from the code 105, for example if code 105 is written in TypeScript but compiled to JavaScript before transmission to the web browser) from the web assets server/database 115 and to load data 135 that the web application is intended to display within the webpage 130 from another database 140. Database 140 may be, for example, a relational database management system (RDBMS) that stores various tables of data that an organization generates as part of its activities and that the user of the user computing device 120 may be interested in for purposes of auditing, quality control, corporate strategy, employee evaluation, or any other task that might typically be performed within a business or non-profit organization.

In some embodiments, the server or repository 110 or the web server 125 may require particular credentials from the developer or end user to upload code 105 or download the webpage 130, respectively. In other embodiments, interaction may be allowed, but restricted; for example, uploaded code 105 may not be published for others' use until manually approved, or data components in the webpage 130 may not load columns with data that a user does not have permission to access and view.

Although in a preferred embodiment, both the developer's computing device 100 and the end user's computing device 120 are desktop or laptop computers using typical web browsers to upload and download the code 105 or download the webpage 130, respectively. In other embodiments, other types of devices or displays may be used, such as mobile phones, other mobile computing devices, or native client applications on other smart devices capable of displaying HTML while restricting other traditional web browsing functionality.

Although a particular division of functions between devices is described in the system above, other configurations are possible in which functions are divided among devices differently. For example, all of the functions of the server or repository 110, the server/database 115, the web server 125, and the database 140 may be performed by a single device with multiple threads executing different software modules simultaneously. Similarly, devices might be grouped by functionality, such that the functions of the devices 115 and 140 are handled by a single database/server, while the server or repository 110 and the web server 125 are a single server distinct from any databases. Alternatively, each system may be, instead of a single device, a cluster of computing devices sharing functionality for concurrent processing and load balancing. The specific number of computing devices and whether communication between them is network transmission between separate computing devices or accessing a local memory of a single computing device is not so important as the functionality that each part has in the overall scheme.

Further, although various computing devices 100, 110, 115, 120, 125, and 140 are described as if they are one computing device or cluster each, a cloud-based solution with multiple access points to similar systems that synchronize their data and are all available as backups to one another is preferable to a unique set of computing devices all stored at one location.

Figure 2:
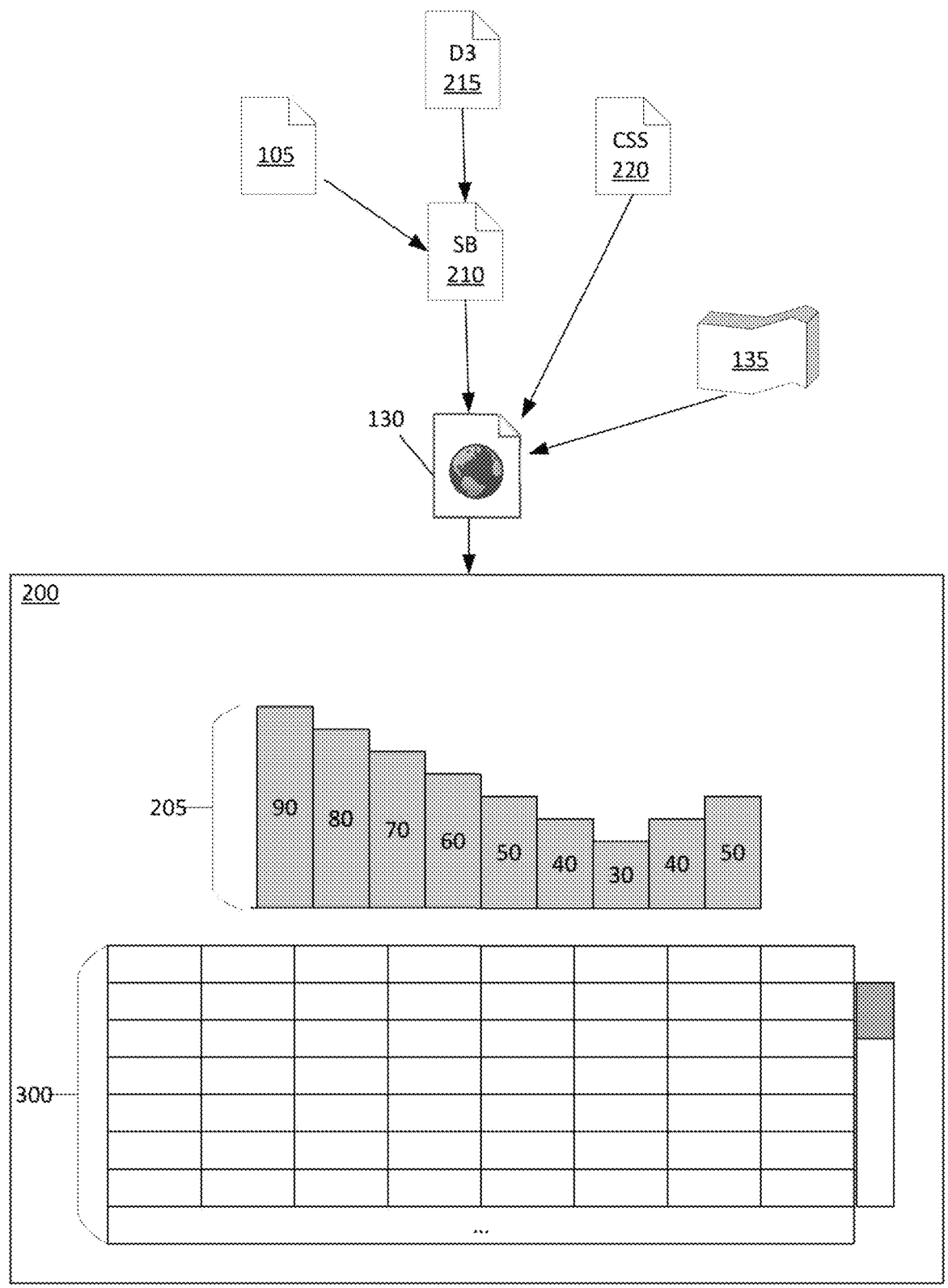
FIG. 2 depicts a possible configuration of files and messages being used to generate a web-based user interface with interactive data presentation.

FIG. 2 depicts a possible configuration of files and messages being used to generate a web-based user interface with interactive data presentation.

In order to generate a user interface 200 that includes a datagrid 300 and a chart 205, the webpage 130 is rendered within the user's web browser. Whether through server side "include" statements, tags included in the HTML, or through asynchronous function calls (such as AJAX calls) after the webpage is loaded, the webpage loads the Starburst library 210, which itself depends in part on the D3.js charting software library and on the configuration files or code 105 provided the developer. The webpage 130 also loads CSS files 220 to ensure uniformity of presentation across elements as specified by the CSS. Finally, data 135 is requested from the database 140 to populate the datagrid 300 or chart 205 after the Starburst library has created the reference points within the webpage in which to incorporate the received data.

Figure 3:
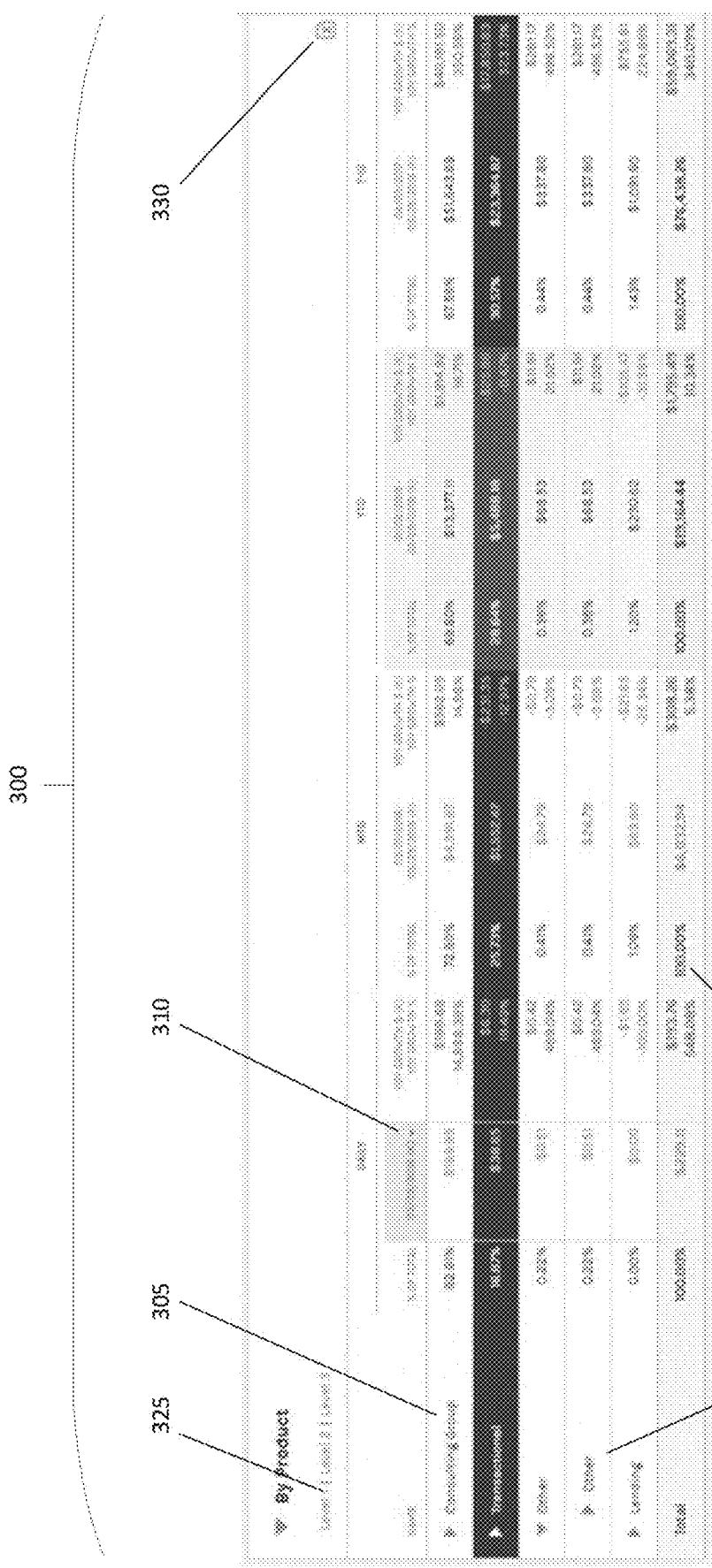
FIG. 3 depicts an example web-based user interface, focusing on a datagrid, that could be generated incorporating many of the data visualization features described herein.

FIG. 3 depicts an example web-based user interface, focusing on a datagrid, that could be generated incorporating many of the data visualization features described further below.

A datagrid 300 comprises tabular data with a number of rows 305 and columns 310. As is visible in the column indicated, each column header may be clicked to automatically sort the rows by their values in that column.

Summary data, such as a "total" row 315, may be automatically generated when the datagrid is populated, including sums, averages, counts, or other statistics as specified by a configuration or by a default for a particular datagrid type.

In some datagrids, information is grouped and nested, such that clicking on one row will reveal one or more additional rows 320 logically grouped within that row. In the present example, the additional rows 320 have identical columns and can be displayed inline naturally with the other rows of the datagrid 300. In other datagrids, a datagrid with different columns may be nested within a row of another datagrid, as described and depicted further below in regard to FIG. 4.

Datagrids will often be accompanied by one or more tabs or filters 325 that a user can select to decide what data will be displayed within the datagrid.

Finally, an Excel export button 330 may be included to allow for easy export of the datagrid into an .XLSX or other format of spreadsheet file to be downloaded for offline analysis and computation. A method of generating such spreadsheets is discussed further below in regard to FIG. 5.

Datagrids such as the one depicted in FIG. 3 can be supplemented with all sorts of additional functionality, as described in the following sections.

Dynamic Logic

When displaying data in a datagrid or chart, there are many use cases where Starburst itself adapts the controls dynamically to more usefully display data within them, Starburst includes logic for adaptively displaying data based on qualities of that data to maximize usefulness to a human reviewing the data. For example, instead of displaying all numbers at the fullest level of precision known, numbers may be shown with a limited number of significant figures and an appropriate identifier of the modification; as a result, "2148" might be replaced with "2K" and "8348217" with "8.3M", so that walls of numbers do not overwhelm the user and the user can more easily compare the magnitudes of wildly different numbers. If the user groups data in a datagrid, such as grouping values of all employees by location, or all offices by nation, the numbers for derived totals of each group may likewise be automatically adapted into a summary to the nearest thousand, million, or billion.

Starburst can include logic to determine whether a user has privileges or credentials needed to view certain columns and, if not, automatically prevent their display to the user.

Starburst can also include logic to determine that some elements of a datagrid do not only convey information themselves, but also could be a pointer to a source of additional information, and respond by hyperlinking the data. For example, if a value in one table of a database is a key value for a join of data in other tables (e.g., if a particular customer is a row in one datagrid, and another table stores transactions keyed to that particular customer's ID), the key value may be converted into a hyperlink, such that clicking, tapping, mousing over, or otherwise interacting with the hyperlink causes additional information to be displayed, whether in a tooltip menu, or in a nested datagrid that is opened within the main datagrid, or in an external webpage to which the web browser will navigate, leaving the webpage in which the datagrid is embedded.

Code may be written by developers to visually indicate that an option is theoretically available under some circumstance not currently in effect. For example, it may be indicated that a column cannot currently be viewed, but could be viewed with additional entitlements, of that a filter cannot be chosen because no data corresponds to the filter. Visual representation may be made by "greying out" an option, showing it in a strikethrough font style, showing it in red or a different color, or showing it with reduced opacity, or any other means of visual distinction that hint to the user that the problem exists.

Tracking, Messaging, and Other Functionality

Functionality is included by default in Starburst to track user clicks on any elements of a datagrid or chart in order to provide summary data indicating what features are useful to users and whether particular users are accessing particular data, for purposes of ensuring that privacy policies are being complied with.

In addition, a developer can write separate code and use Starburst to have a function be called every time a particular user interface interaction occurs. For example, the user clicking, tapping, mousing over, or otherwise interacting with a hyperlinked element in a datagrid may cause the system to log a message, to generate an email, or to use an application programming interface (API) of other software to take action based on the user's interaction.

Filtering

A developer is able to specify via configuration that certain filtering options should be made available for a given datagrid. In some embodiments, the developer with be able to specify filtering rule logic that will be enforced when the user attempts to activate a filter. For example, the developer's configuration may specify that certain filters are mutually exclusive in order to preserve stability, not allowing a set of filtering choices that cannot have overlap and therefore would allow zero rows to be displayed. In another example, a developer might require the user to select multiple options from a set of checkboxes before the filter will be activated, so that a table containing millions or billions of potential rows is not displayed until the filter has reduced that number to a manageable number of rows to display.

A developer's filter configurations may be published as a plugin that can be easily incorporated into another web application's datagrid.

In some embodiments, a filter may be activated on a column that has been hidden by a user. As a result, the user may see less data than is expected, for a reason that is not immediately obvious to the user. In that circumstance, a visual identifier may be generated, warning the user that data is being hidden from view and advising them to either remove the filter or to re-enable display of the column that is being filtered.

State Retention

In many embodiments, it is preferred to track the user's preferences in using the user interface, in order to recreate the user interface at future times according to those preferences.

For example, when a user applies a filter to a datagrid and then closes the webpage, the datagrid may be configured to automatically apply the same filter the next time it is loaded, so that the user can start from an identical starting point the next time they load the webpage.

For another example, some grids contain so many columns by default that their use is unwieldy or difficult to manage. A user may select a number of columns to hide, and this decision to hide columns will be stored and re-applied each time the datagrid is reloaded, unless or until the user restores a previously hidden column. Importantly, the user's column preferences should always be stored as a "negative" or a "blacklist," instead of an affirmative set of columns to include or a "whitelist." In this way, if the definition of the datagrid changes to include new columns, or if the user gains entitlements to view columns that previously required entitlements that the user lacked, the new columns will default to being visible instead of requiring the user to check whether there are new hidden columns.

Nested Datagrids

FIG. 4 depicts a multi-dimensional nested datagrid that can be generated according to the system and methods described herein.

In an example datagrid, an electronics wholesaler might want a datagrid 400 showing total sales by office 405, which are values that can be compared apples-to-apples across offices. Upon clicking on any particular office 405, a list of departments 410 might be displayed, each with the same available columns 425 for display. However, if one of the departments 410 is selected, the user might find that the data 415 displayed under that row uses a completely different column structure 420 than the column structure 425 for the other levels of the datagrid.

Starburst datagrids can be infinitely nested within one another, regardless of column structure. The system will enforce the boundaries between layers of the datagrids and determine when to propagate events up or down between parent and child datagrids. For example, if a filter removes rows from a lower-level datagrid that contribute to totals expressed in a higher-level datagrid, the totals need to be appropriately updated after the rows are removed. Similarly, if a filter removes a row that contains a nested datagrid, that entire datagrid may need to be removed. In contrast, some filtering decisions at one level may have no effect on datagrids at another level.

Boundaries are also automatically enforced with respect to sorting. If a column is sorted at one level of a datagrid, the sort must be applied only to portions of the datagrid for which that spatial region contains values related to that sorted column. For example, if the datagrid 400 is sorted by "Sales—YTD", the relative positioning of Windows and Mac PCs 415 sold in Seattle, despite occupying the same apparent column as the "Sales—YTD", should not change, even though more Mac PCs were sold than Windows ones. The ordering within the nested datagrid is protected from extraneous sorting at a higher level.

Exporting to Spreadsheet

Figure 5:
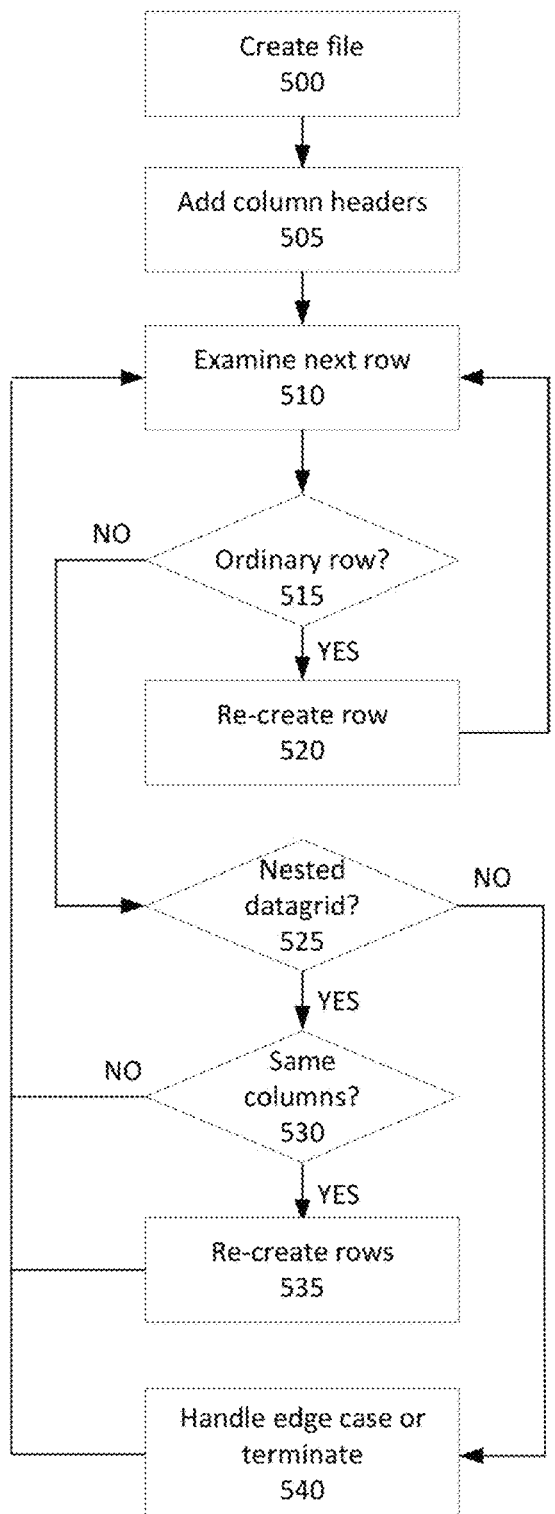
FIG. 5 depicts, in simplified form, a method of exporting datagrids to a spreadsheet file.

Although web-based interfaces are extremely useful for reviewing data, they are less useful for performing calculations. Rather than require a user to copy and paste data into a spreadsheet to perform calculations based on the data, it is preferable to provide automatic exporting and generation of a downloadable spreadsheet. FIG. 5 depicts, in simplified form, a method of exporting datagrids to a spreadsheet file.

Initially, on the server side, a new empty file is created in an Open Office Extensible Markup language (OOXML) spreadsheet file format (e.g., an .XLS or .XLSX) (Step 500). It is preferred to generate the file on the server-side because some datagrids may display only a first n rows and require the client to repeatedly reload or scroll the datagrid down to obtain more rows. The server will be able to generate a spreadsheet including all rows regardless of whether the client-side datagrid has them. OOXML-formatted files are preferred for their compatibility with many office software suites and their ability to specify presentation data such as color, font, column and row size, etc.; in alternative embodiments, other formattable spreadsheets may be generated, such as an ODS file or a Google Sheets document, or in some applications, a non-formattable spreadsheet such as a Comma Separated Value spreadsheet (.CSV) may be acceptable.

The column headers of the datagrid may next be created in the first row of the spreadsheet (Step 505). If a column is hidden by the user in the datagrid, the same column should not be present in the exported spreadsheet.

Next, each row of the datagrid that is actually visible (or that could be visible under circumstances such as scrolling down or loading additional rows) is examined for re-creation within the spreadsheet (Step 510). If the list is sorted or has had filters applied to it, the rows should be generated in the same order as in the sort (rather than in the initial ordering of the datagrid before the sort) and with the filter(s) applied (such that if a row was filtered out of the datagrid at the moment of the export, it is not included in the spreadsheet).

If the row is an ordinary row of the datagrid (i.e., not a nested datagrid in place of a row) (Step 515), then it is re-created within the spreadsheet (Step 520).

In one embodiment, the spreadsheet row is created to approximate as closely as possible the row in the datagrid, including text color, text background color, typeface, font styling, dimensions of each cell, and so on. If the typing of data is known or determined to be something other than text, such as a number, decimal, currency, or date, the cell(s) containing such typed data may be created to have that typing explicitly designated. Such determinations may be made based on consulting the database from which the datagrid's information comes; regular expressions; the presence of particular characters such as currency signs, decimal points, commas, dashes, slashes, or other punctuation; or other attempts to parse the data from the datagrid.

In other embodiments, a separate configuration file may be provided to customize elements of the spreadsheet to have different styling or even different contents from the datagrid. For example, as described above, a datagrid may sometimes replace a value with an approximation, such as replacing "2148" with "2K" or "8348217" with "8.3M"; in such an instance the spreadsheet file should include the true value to facilitate calculations, not a value with unnecessary imprecision. For another example, configuration information may indicate how to handle hyperlinks depicted in the datagrid; some may be external links to include in the spreadsheet as well, but some may be used primarily to capture mouse events in the user interface and need not be recreated, being replaced with ordinary text instead.

After creation of the row, the next row is examined (back to Step 510).

If a row in the datagrid has one or more nested datagrids within it (Step 525), it is determined whether the nested datagrid has the same columns as the other rows of the higher-level datagrid (Step 530). If the datagrid does have the same columns, the entire nested datagrid is recursively included as a set of additional rows in the spreadsheet (Step 535). If the datagrid has different columns, it is not included in the spreadsheet in a preferred embodiment. In other embodiments, a nested datagrid with different columns may be created elsewhere in the worksheet from the re-created rows, in a different worksheet, or in a separate spreadsheet entirely that is downloaded in conjunction with the primary spreadsheet. If it is not exported automatically, the nested datagrid may have its own separate export button within the user interface to allow generation of a spreadsheet that contains it.

If a row is neither an ordinary row nor a nested datagrid, additional logic may be provided to handle the edge case and create an appropriate corresponding element in the spreadsheet (Step 540), or the contents of that row may be simply dropped, as appropriate. If there are no more rows, the process terminates and the spreadsheet file is made available for download.

At the conclusion of the process, opening the downloaded spreadsheet file should result in viewing a grid of filled cells with virtually identical appearance to the appearance of the datagrid in the user interface at the moment that the user requested the export. If a different configuration for spreadsheet presentation is provided compared to the configuration for datagrid presentation in the user interface, the differences should be limited to the optimizations where additional functionality is present in the spreadsheet compared to the datagrid.

Axis Breaks

In many instances, data may be plotted that has a strongly multimodal distribution/clustering of values. For example, plotting salaries of employees at a hospital could show strong clusters each among the nursing staff, among the doctors, and among the hospital's CEO and other corporate officers. Rather than show an expansive range along the axis, and consequently compress the differences between each cluster, it is preferable to remove unused subsets of the axis and expand each cluster of values to better see the small differences between them in a chart.

FIG. 6A and FIG. 6B depict two versions of a chart with identical data; one with a uniform axis, and one where two axis breaks are introduced to allow widely variant values to be plotted without shifting to a different axis type, such as logarithmic, that doesn't preserve absolute differences in data values. The clusters 600, 605, and 610, which are virtually indistinguishable in FIG. 6A, have differences that are much more pronounced once axis breaks 615 have been introduced.

Figure 7:
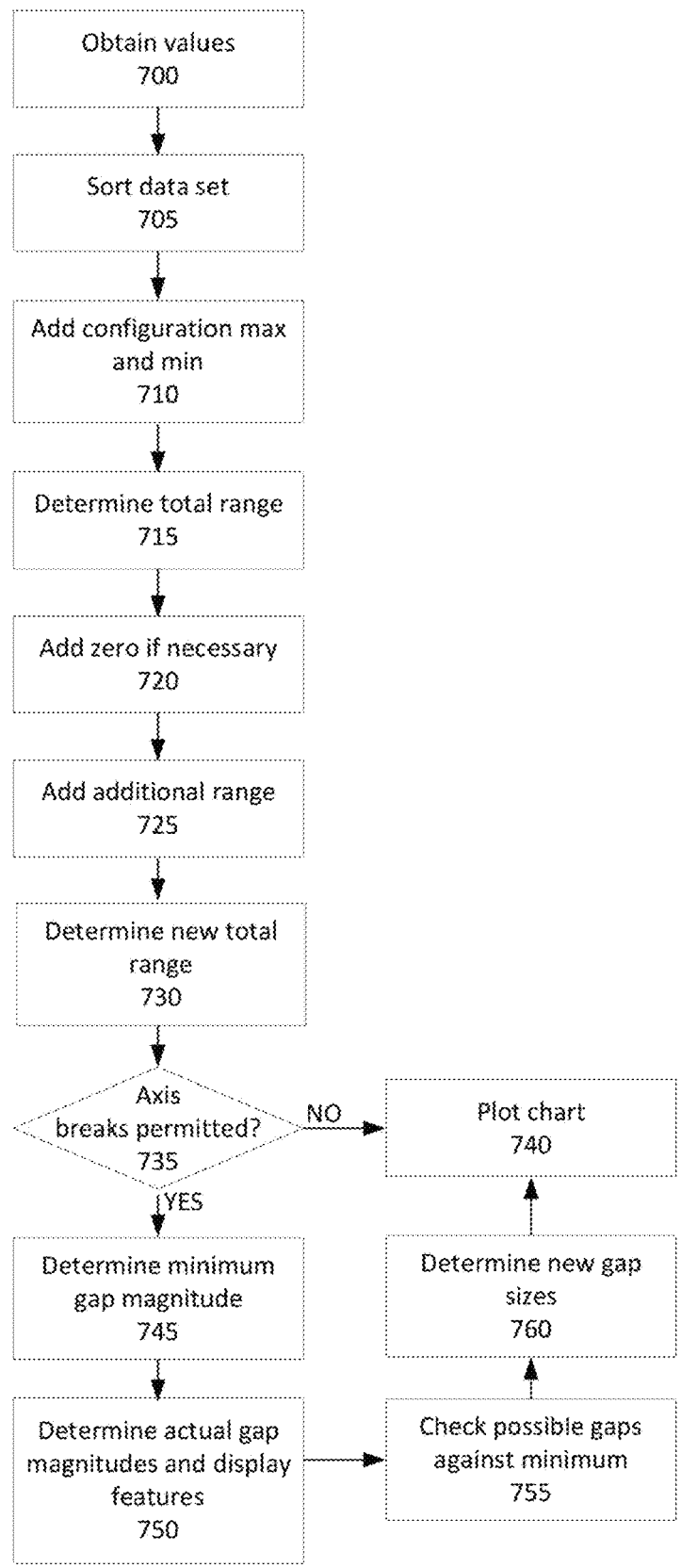
FIG. 7 depicts, in simplified form, a method of determining where to place axis breaks for an input data set.

Although human placement of an axis break in a chart is well known, automatically generated charts tend not to include an axis break because of the judgment calls needed in deciding whether to introduce them in a chart, and if so, where. Starburst includes features for FIG. 7 depicts a method of determining where to place axis breaks for a given input data set, and FIGS. 8A through 8E depict graphically the determinations being made at various steps of the method of FIG. 7.

Initially, the set of values to be plotted is received (Step 700), and optionally additional configuration information specified by a developer is received as well. The configuration information may include, in some embodiments, a minimum axis value to display even if all data values are greater than that minimum, a maximum axis value greater than the greatest value to be plotted, or a maximum number of axis breaks to be introduced.

Next, determining the magnitude of the visual data range begins by sorting the data set (Step 705). If the minimum and maximum axis values were provided in the configuration, and if they are less than or greater than the least and greatest values respectively, they are added to the set of values being sorted (Step 710); otherwise, they are ignored. The magnitude of the visual range is determined by calculating the difference 810 between the minimum value 800 and the maximum value 805 (Step 715) (see also FIG. 8A).

Additionally, in a preferred embodiment, a data value 815 representing zero is added to the dataset if there exist both positive and negative values to plot (Step 720), so that zero will always be explicitly plotted and never disappear within an axis break.

If either the minimum or maximum value are not zero, an additional 100,% of the total range 810 above 820 or below 825 are added as values, respectively, to be plotted (Step 725) (see also FIG. 8B). However, if adding that 10% would cause a range that is exclusively above or below zero to cross over into negative or positive territory, respectively, zero should be added as a data point, but not the value that would be below or above zero. In a preferred embodiment, 10% is used, though other values may be used in other configurations.

Next, the new total range 830 to be displayed based on these extended ranges is calculated (Step 730) (see also FIG. 8B).

If the maximum number of axis breaks is zero (Step 735), the method terminates without plotting any axis breaks and plots the chart normally (Step 740). If the maximum number of breaks is unspecified, the method may be configured to treat the silence as a prohibition of axis breaks, or else select a default value such as one, two, or three. If at least one break is permitted, a minimum size is determined for an empty range that can be replaced by an axis break (Step 745). In a preferred embodiment, the minimum size is equal to the extended total range 830 divided by the number of breaks (n) plus one. Thus, if one break is permitted, it will only be used if there is a contiguous region that takes up 50% of the extended total range 830. If three breaks are permitted, they will only be used if there are one or more contiguous regions each with 25% of the extended range, and if four breaks are permitted, they will only be used if there are one or more contiguous regions each with 20% of the extended range, and so on. In other embodiments, the extended total range 830 may be divided by n+2 or by n plus a greater number, permitting even smaller regions to be identified and replaced. In further embodiments, the number of axis breaks and the potential size of axis breaks/sensitivity to gaps may be mathematically divorced from one another, such that, for example, only two breaks are permitted by the developer, but they are permitted if there are gaps of at least 10% of the maximum range, not only gaps of 33% or greater as the default embodiment would require.

Next, the actual magnitudes 835 of gaps between each neighboring pair of points are determined (Step 750) (see also FIG. 8C) in the sorted set of points that includes all data and the additional reference points previously added, if any. The determination of an actual gap magnitude may take into account not only the numerical difference between two values, but also the size of any graphical representation of those values. For example, if two values are plotted at y=100 and y=200, but they are represented by circles with a radius equal to 5 units along the y-axis, the true gap between those values is only 90 units, not 100, since removing a gap of 100 units would cause the circles to overlap and potentially become illegible or indistinguishable.

Next, it is determined whether the largest n gaps are greater than the minimum gap size previously determined (Step 755). For each gap that is greater, the gap will be replaced in part with an axis break. Note that in the scheme described in the preferred embodiment, any gap larger than the minimum gap size must occur within the first n gaps, but if a different divisor is used in the step described above, it is possible that there will exist gaps larger than the minimum gap size, but that will not be replaced with an axis break because of the maximum number of axis breaks specified.

Since each gap should only diminish the distance between disparate values, not eliminate the distance, a new gap size must be determined (Step 760). In a preferred embodiment, additional plotted values are set at 10% of the gap size from the bottom 840 of the gap, and at 10% of the gap size from the top of the gap 845, such that 80% of the gap 850 will remain unplotted in the final chart. In alternative embodiments, more of the gap may remain unplotted (for example, 5% plotted above and below, with 90% unplotted) or less of the gap may remain unplotted (for example, 20% plotted above and below, with 60% unplotted).

Finally, the chart is plotted (Step 740) (see also FIG. 8E) with the axis breaks 850 included. As a result of the gap reduction, the user can still see each cluster of data points, but the points within each cluster are more easily distinguished and more easily selected with a mouse to learn more about a datapoint.

Figure 9:
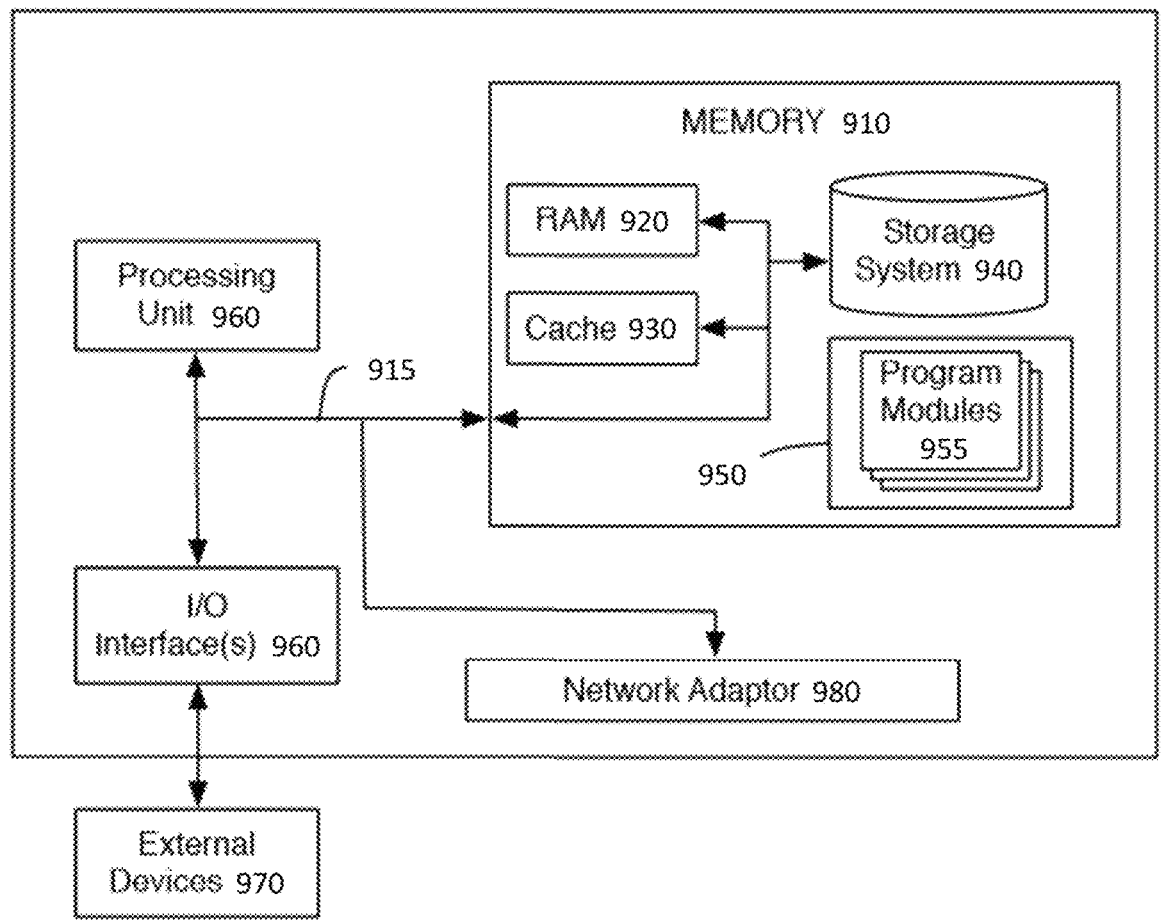
FIG. 9 is a high-level block diagram of a representative computing device that may be utilized to implement various features and processes described herein.

Although FIG. 1 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 9 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C. C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for generating user interface components in a web-based interactive user interface comprising:
one or more processors; and
non-transitory memory storing instructions that, when executed by the one or more processors, cause the one or more processors to:
receive one or more CSS files specifying a desired standardized appearance for user interface components;
receive an HTML, file specifying the interactive user interface and including custom tags, corresponding to one or more user interface components; and
provide a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components; and
via either the script or a second script, update the one or more user interface components to update presentation of the data in accordance with the requested change, wherein columns in datagrids default to being displayed, and wherein a data structure is provided to store only columns affirmatively hidden by a human user, such that if a column is newly created or if the human user receives entitlements to view a column that was the human user was previously unentitled to view, the column is automatically displayed to the human user.

2. The system of claim 1, wherein one of the one or more user interface components is a nested datagrid, such that at least one row of a first datagrid comprises a second datagrid itself, and such that at least one row of the second datagrid comprises a third datagrid.

3. A system for generating user interface components in a web-based interactive user interface comprising:
one or more processors; and
non-transitory memory storing instructions that, when executed by the one or more processors, cause the one or more processors to:
receive one or more CSS files specifying a desired standardized appearance for user interface components;
receive an HTML, file specifying the interactive user interface and including custom tags, corresponding to one or more user interface components;
receive a specification of a filter plugin for a datagrid; and
provide a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components;
via either the script or a second script, update the one or more user interface components to update presentation of the data in accordance with the requested change; and
provide one or more additional filtering options specified by the filter plugin to hide data from the datagrid, wherein the one or more additional filtering options are guaranteed to be stable, such that no selectable set of filtering options would filter out all data from the datagrid, and would always allow at least one row of data to be displayed.

4. A system for generating user interface components in a web-based interactive user interface comprising:
one or more processors; and
non-transitory memory storing instructions that, when executed by the one or more processors, cause the one or more processors to:
receive one or more CSS files specifying a desired standardized appearance for user interface components;
receive an HTML, file specifying the interactive user interface and including custom tags, corresponding to one or more user interface components, wherein one of the one or more user interface components is a chart displaying data values along an axis; and
provide a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components;
via either the script or a second script, update the one or more user interface components to update presentation of the data in accordance with the requested change;
automatically identify two or more intervals, each of greater size than an interval size dynamically determined based on the data values, in which no data value falls along the axis; and
render the chart such that each of the two or more intervals are replaced in part, but not in whole, by an axis break that indicates an empty portion of the axis along the identified intervals has been removed.

5. The system of claim 1, wherein a user interface component is provided to export a datagrid into a spreadsheet in the Open Office XML format (OOXML) that recreates a same ordering of information, set of visible fields for information, and visual styling of information.

6. The system of claim 1, wherein additional code is provided by a human developer to be executed within the web browser in response to contents of a datagrid changing, and wherein the web browser executes the code when the contents of the datagrid change.

7. A system for generating user interface components in a web-based interactive user interface comprising:
one or more processors; and
non-transitory memory storing instructions that, when executed by the one or more processors, cause the one or more processors to:
receive one or more CSS files specifying a desired standardized appearance for user interface components;
receive an HTML, file specifying the interactive user interface and including custom tags, corresponding to one or more user interface components; and
provide a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components; and
via either the script or a second script, update the one or more user interface components to update presentation of the data in accordance with the requested change, wherein a hyperlink is automatically added around contents of a datagrid to indicate that interacting with the hyperlink will update a view of the datagrid, provide a contextual popup menu, or link to an external webpage related to the contents around which the hyperlink was added.

8. The system of claim 7, wherein interacting with the hyperlink causes a message to be transmitted from the web browser and, upon receipt of the message, the system tracks that the interaction has occurred.

9. A computer-implemented method for generating user interface components in a web-based interactive user interface comprising:
receiving one or more CSS files specifying a desired standardized appearance for user interface components;
receiving an HTML, file specifying the interactive user interface and including custom tags, corresponding to one or more user interface components; and
providing a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components; and
via either the script or a second script, update the one or more user interface components to update presentation of the data in accordance with the requested change, wherein columns in datagrids default to being displayed, and wherein a data structure is provided to store only columns affirmatively hidden by a human user, such that if a column is newly created or if the human user receives entitlements to view a column that was the human user was previously unentitled to view, the column is automatically displayed to the human user.

10. The method of claim 9, wherein one of the one or more user interface components is a nested datagrid, such that at least one row of a first datagrid comprises a second datagrid itself, and such that at least one row of the second datagrid comprises a third datagrid.

11. A computer-implemented method for generating user interface components in a web-based interactive user interface comprising:
receiving one or more CSS files specifying a desired standardized appearance for user interface components;

receiving an HTML, file specifying the interactive user interface and including custom tags, corresponding to one or more user interface components;
receiving a specification of a filter plugin for a datagrid; and
providing a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components;
via either the script or a second script, update the one or more user interface components to update presentation of the data in accordance with the requested change; and
provide one or more additional filtering options specified by the filter plugin to hide data from the datagrid, wherein the one or more additional filtering options are guaranteed to be stable, such that no selectable set of filtering options would filter out all data from the datagrid, and would always allow at least one row of data to be displayed.

12. A computer-implemented method for generating user interface components in a web-based interactive user interface comprising:
receiving one or more CSS files specifying a desired standardized appearance for user interface components;
receiving an HTML, file specifying the interactive user interface and including custom tags, corresponding to one or more user interface components, wherein one of the one or more user interface components is a chart displaying data values along an axis; and
providing a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components;
via either the script or a second script, update the one or more user interface components to update presentation of the data in accordance with the requested change;
automatically identifying two or more intervals, each of greater size than an interval size dynamically determined based on the data values, in which no data value falls along the axis; and
rendering the chart such that each of the two or more intervals are replaced in part, but not in whole, by an axis break that indicates an empty portion of the axis along the identified intervals has been removed.

13. The method of claim 9, wherein a user interface component is provided to export a datagrid into a spreadsheet in the Open Office XML (OOXML) format that recreates a same ordering of information, set of visible fields for information, and visual styling of information.

14. The method of claim 9, wherein additional code is provided by a human developer to be executed within the web browser in response to contents of a datagrid changing, and wherein the web browser executes the code when the contents of the datagrid change.

15. A computer-implemented method for generating user interface components in a web-based interactive user interface comprising:
receiving one or more CSS files specifying a desired standardized appearance for user interface components;
receiving an HTML, file specifying the interactive user interface and including custom tags, corresponding to one or more user interface components; and
providing a webpage comprising the one or more user interface components to a human user such that, when rendered and executed by a web browser of the human user, the web browser will:
via a script executed by a web browser displaying the user interface, render the one or more user interface components indicated by the tags, load data into the one or more user interface components and style the one or more user interface components in accordance with the CSS file;
receive, from a human user of the user interface, input requesting a change to presentation of data in the one or more user interface components; and
via either the script or a second script, update the one or more user interface components to update presentation of the data in accordance with the requested change, wherein a hyperlink is automatically added around contents of a datagrid to indicate that interacting with the hyperlink will update a view of the datagrid, provide a contextual popup menu, or link to an external webpage related to the contents around which the hyperlink was added.

16. The method of claim 9, wherein interacting with the hyperlink causes a message to be transmitted from the web browser and wherein the method further comprises, upon receipt of the message, tracking that the interaction has occurred.

* * * * *